Figure 35:
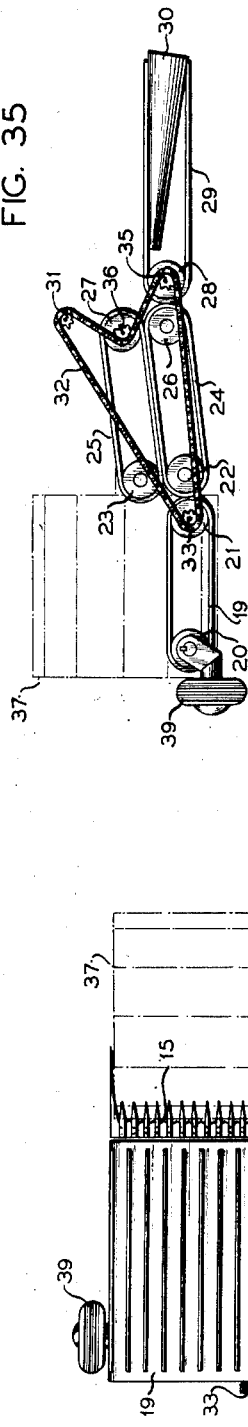

Oct. 13, 1953  W. E. WRIGHT ET AL  2,654,916
COMBINED HARVESTER AND DECORTICATOR
Filed March 9, 1948   13 Sheets-Sheet 1

*INVENTORS*
W. E. WRIGHT
O. H. BOND
BY
A. Yates Dowell
ATTORNEY

Oct. 13, 1953 W. E. WRIGHT ET AL 2,654,916
COMBINED HARVESTER AND DECORTICATOR
Filed March 9, 1948 13 Sheets-Sheet 2

INVENTORS
W. E. WRIGHT
O. H. BOND
BY
A. Yates Dowell
ATTORNEY

Oct. 13, 1953   W. E. WRIGHT ET AL   2,654,916
COMBINED HARVESTER AND DECORTICATOR
Filed March 9, 1948   13 Sheets-Sheet 3

INVENTORS
W. E. WRIGHT
O. H. BOND
BY A. Yates Dowell
ATTORNEY

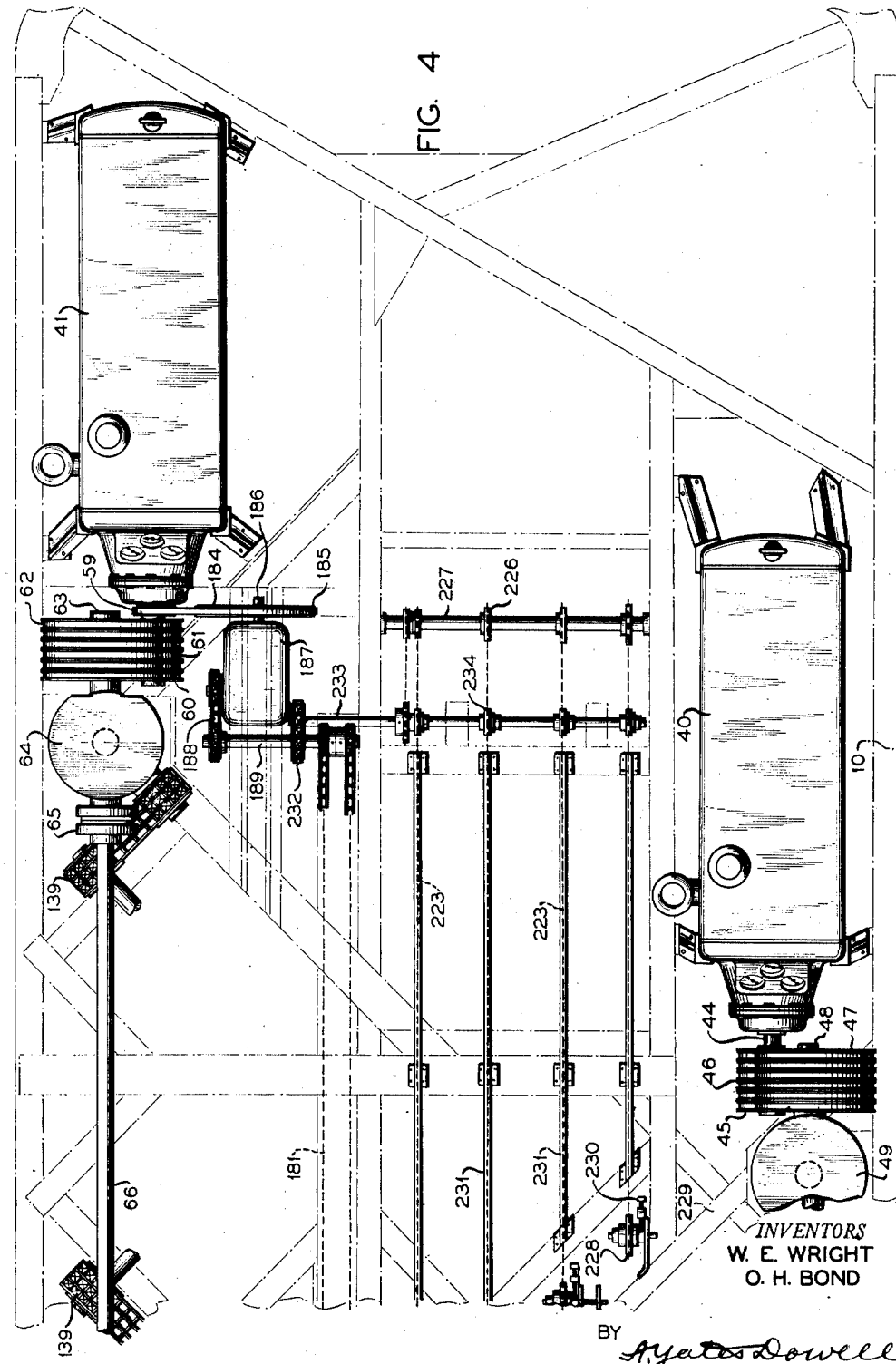

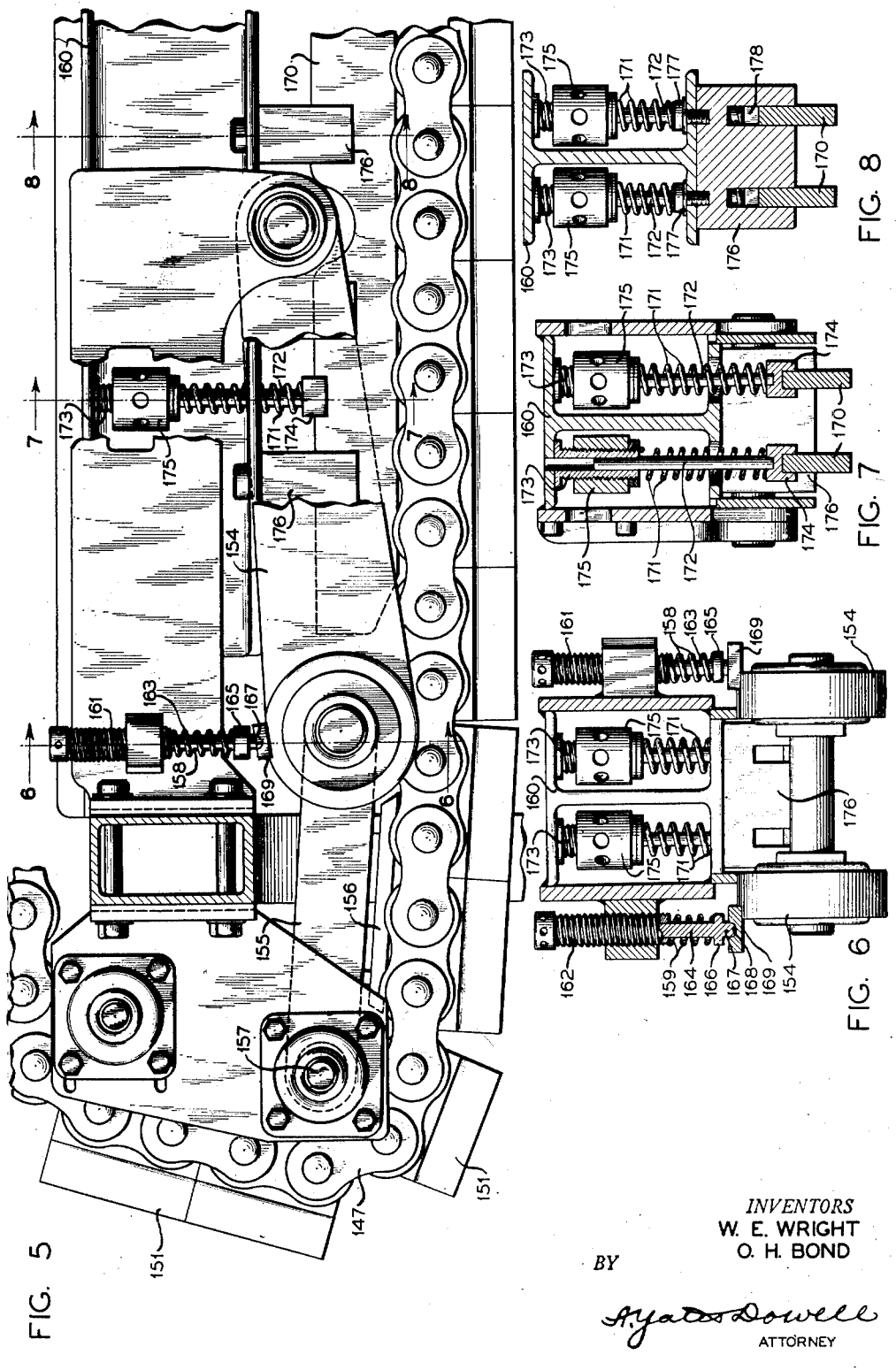

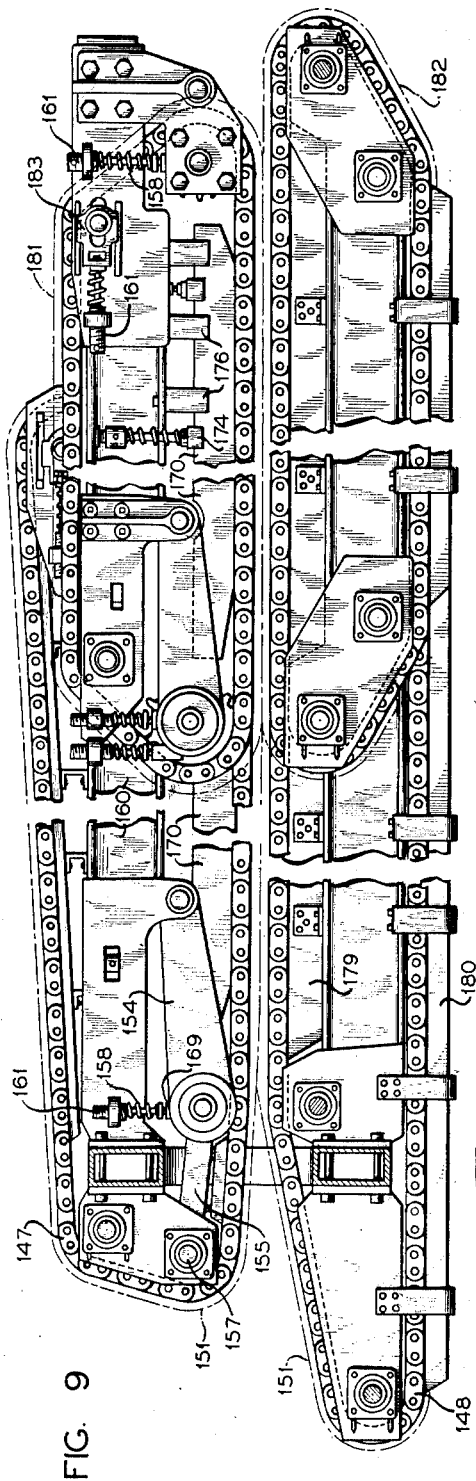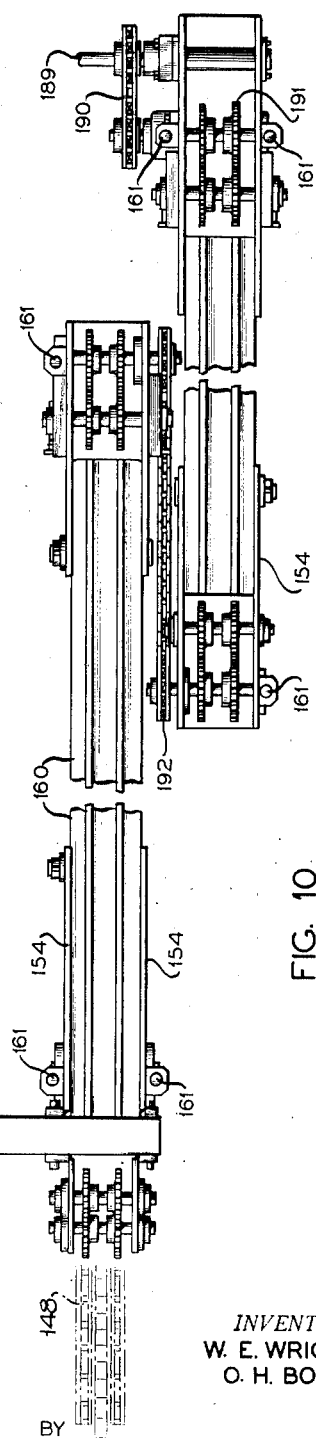
FIG. 9
FIG. 10
INVENTORS
W. E. WRIGHT
O. H. BOND
BY
ATTORNEY

Oct. 13, 1953     W. E. WRIGHT ET AL     2,654,916
COMBINED HARVESTER AND DECORTICATOR
Filed March 9, 1948     13 Sheets-Sheet 7
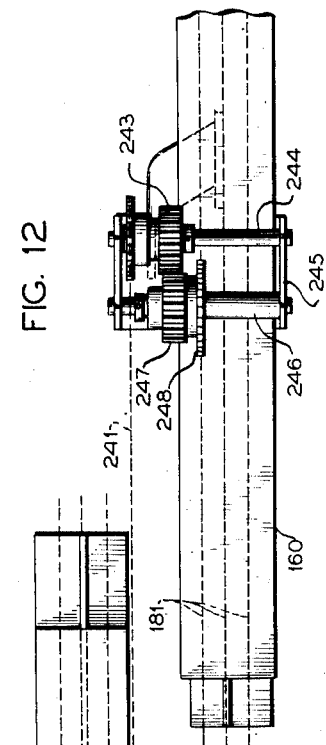
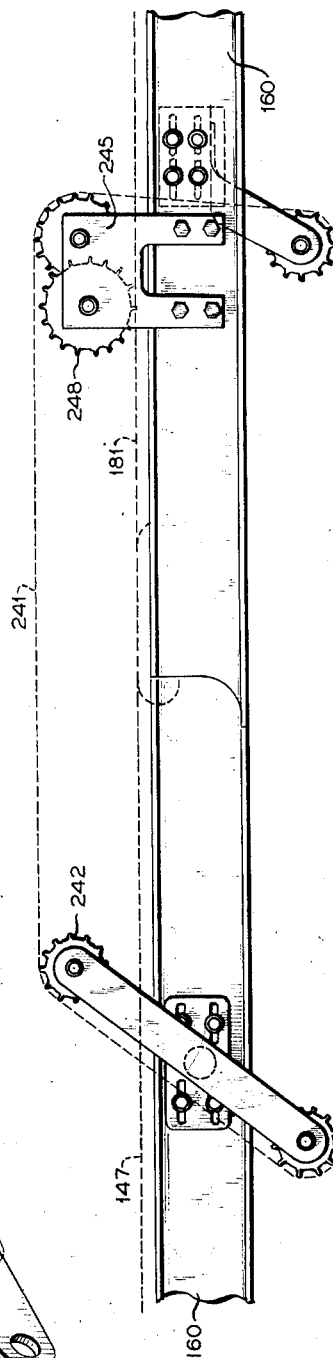
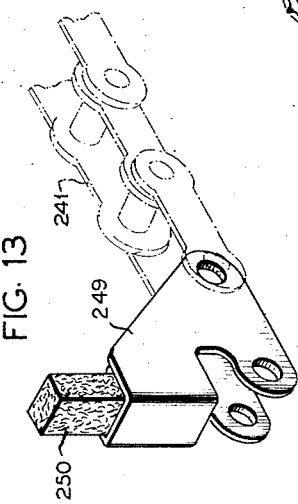
*INVENTORS*
W. E. WRIGHT
O. H. BOND
BY
A. Yates Dowell
ATTORNEY Oct. 13, 1953  W. E. WRIGHT ET AL  2,654,916
COMBINED HARVESTER AND DECORTICATOR
Filed March 9, 1948  13 Sheets-Sheet 8

INVENTORS
W. E. WRIGHT
O. H. BOND
BY
A. Yates Dowell
ATTORNEY

Oct. 13, 1953 W. E. WRIGHT ET AL 2,654,916
COMBINED HARVESTER AND DECORTICATOR
Filed March 9, 1948 13 Sheets-Sheet 9
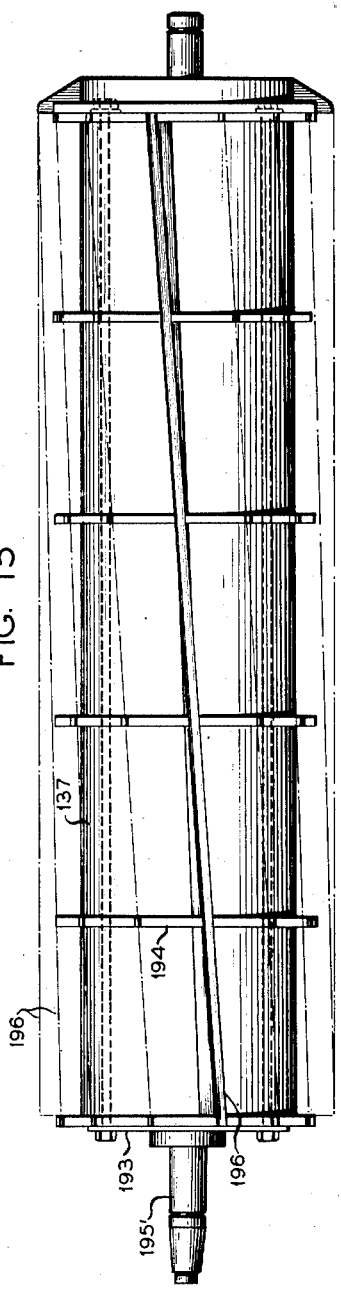
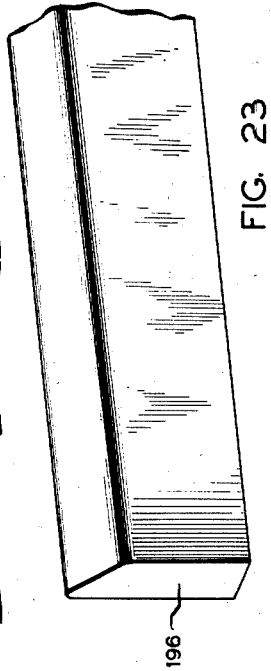
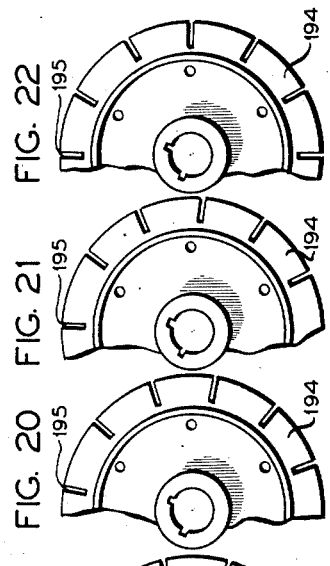
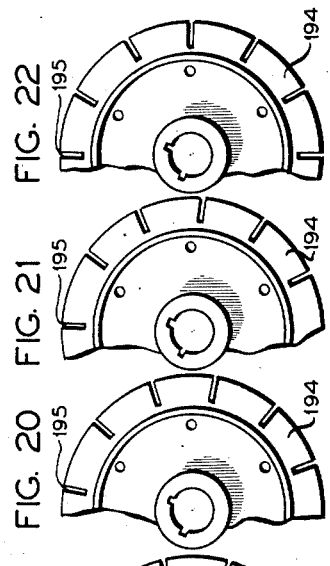
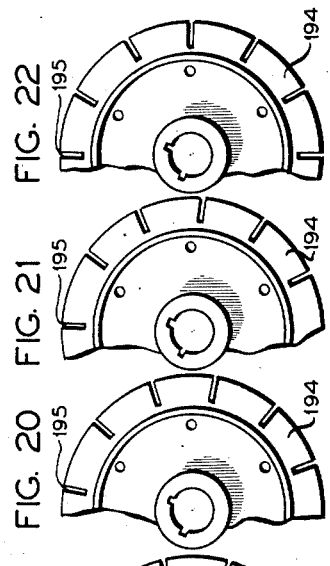
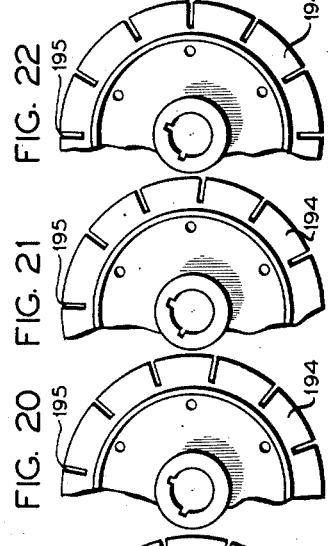
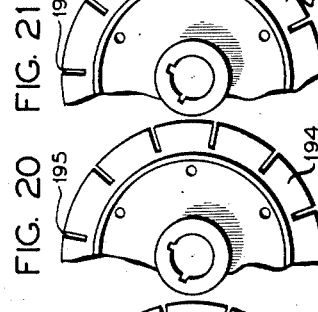
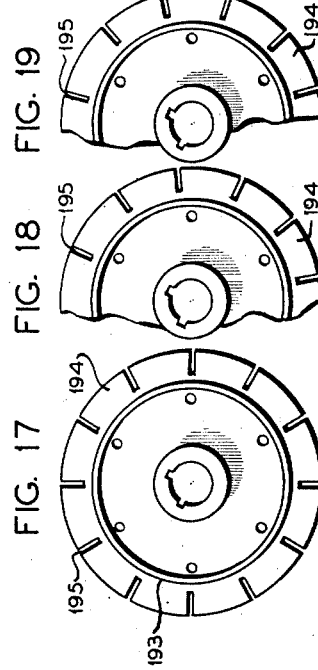
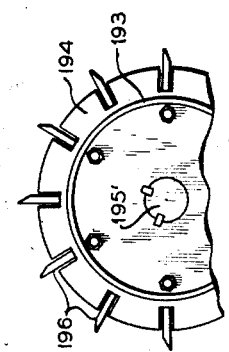
INVENTORS
W. E. WRIGHT
O. H. BOND
BY
A. Yates Dowell
ATTORNEY Oct. 13, 1953   W. E. WRIGHT ET AL   2,654,916
COMBINED HARVESTER AND DECORTICATOR
Filed March 9, 1948   13 Sheets-Sheet 10

INVENTORS
W. E. WRIGHT
O. H. BOND

BY
*A. Yates Dowell*
ATTORNEY

Oct. 13, 1953 W. E. WRIGHT ET AL 2,654,916
COMBINED HARVESTER AND DECORTICATOR
Filed March 9, 1948 13 Sheets-Sheet 12
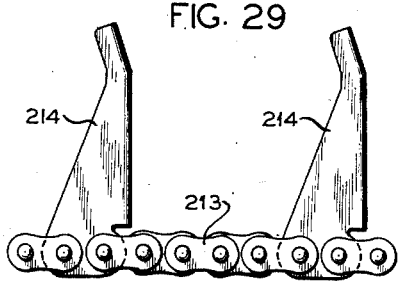
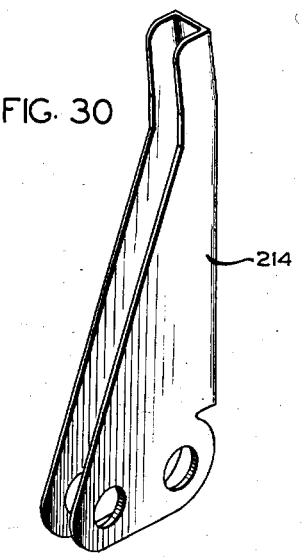
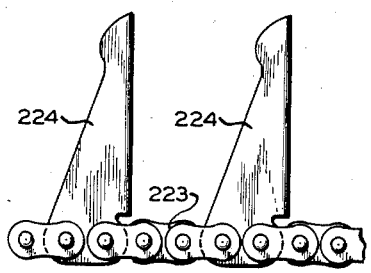
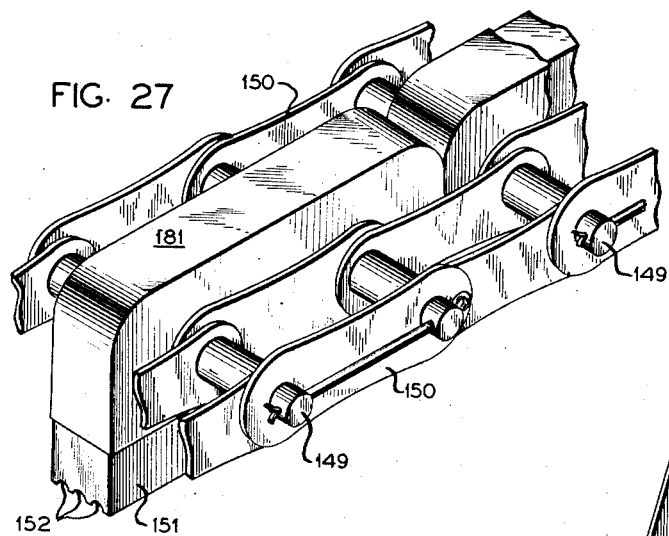
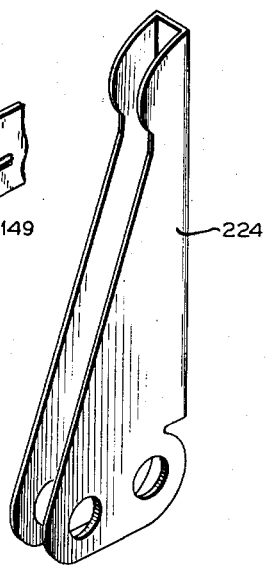
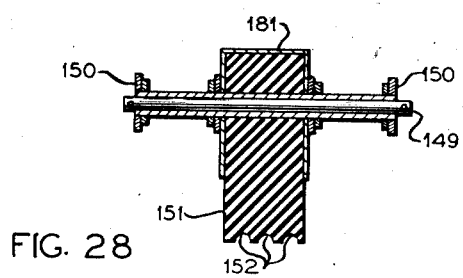
INVENTORS
W. E. WRIGHT
O. H. BOND
BY
ATTORNEY Oct. 13, 1953   W. E. WRIGHT ET AL   2,654,916
COMBINED HARVESTER AND DECORTICATOR
Filed March 9, 1948   13 Sheets-Sheet 13

INVENTORS
W. E. WRIGHT
O. H. BOND
BY
A. Yates Dowell
ATTORNEY

Patented Oct. 13, 1953

2,654,916

UNITED STATES PATENT OFFICE 2,654,916

COMBINED HARVESTER AND DECORTICATOR

William E. Wright, West Palm Beach, and Orson H. Bond, Moore Haven, Fla., assignors to Sea Island Mills, Inc., New York, N. Y.

Application March 9, 1948, Serial No. 13,918

8 Claims. (Cl. 19—12)

This invention relates to improvements in the production of vegetable fiber and more particularly to an improved method and apparatus for harvesting ramie and for preparing fiber therefrom of high commercial quality, this application being a continuation in part of prior application Serial No. 769,840 filed August 21, 1947, for Combined Harvester and Decorticator.

The use of ramie fiber apparently originated in the orient and hand cleaned fiber known commercially as "China grass" was imported into this country for many years up until the time such imports were cut off by military activities in China. This hand cleaned Chinese fiber was not sufficiently free of bark and other parts of the plants and was not received in sufficient quantity to achieve wide use in the textile industry. It has been known to Oriental peoples, however, since antiquity as a source of fiber for domestic cloth.

Some prior work has been done in an attempt to design a successful decorticating apparatus but the majority of these have been designed as general purpose machines and consequently do not operate satisfactorily with ramie, which has peculiar properties requiring specially designed machines. For instance, ramie cannot be fed through a decorticating apparatus by normal feeding rolls since the ramie will wind up on the rolls and will not follow a straight path therebetween. This property therefore requires that some sort of gripping means which will pull the ramie through the machine must be employed. Also, ramie fiber must be processed immediately after cutting the plants, as a fiber destroying ferment apparently of enzymic character begins soon after the plants are cut and the organic gums and resins in the plant also harden and become comparatively insoluble. This requires that the ramie decorticating apparatus be used at the location at which the plants are grown.

As ramie is a tropical plant growing best in damp or swampy soil, the decorticating apparatus must be used in locations where very little skilled labor is available and where it is subject to adverse climatic conditions. To meet these conditions the apparatus must be reasonably easy to transport and assemble, must be as completely automatic in operation as possible and must have little tendency to get out of order. Further in view of the necessity of cleaning the fiber immediately after cutting, it is highly desirable that a harvesting apparatus be combined with the decorticator.

Heretofore, it has apparently been impractical to combine a harvester and decorticator in one unitary apparatus probably because of the heavy weight of previous decorticators and the fact that due to this weight these decorticators could not be designed to incorporate harvesting apparatus and still be light enough to move over damp or swampy ground.

As the usable dried fiber amounts to only about six percent of the green weight of the stalks, any material loss of fiber is extremely important from a commercial view point and consequently the decorticating apparatus must be designed to adequately clean the fiber and still not lose any appreciable amount thereof.

After the fiber has been cleaned and dried it is put through a degumming process which dissolves the organic gums and resins which are present with the fiber. The fibers are then separated and carded according to usual textile methods and may be subsequently bleached, dyed, spun and woven as may be desired.

In order that the fiber separating and carding apparatus may operate successfully on the long staple fibers which the ramie plant produces, it is desirable that the fibers should be substantially parallel in relatively straight ribbons at the conclusion of the decorticating process and it is also highly desirable that these ribbons should contain substantially all of the usable fiber in the stalks.

It is therefore among the objects of the present invention to provide improved harvesting and decorticating apparatus especially adapted to cleaning ramie fiber which will produce relatively straight, thoroughly cleaned ribbons of substantially parallel fibers without material loss of commercially usable fibers.

It is a further object of this invention to provide a combined harvester and decorticator of relatively light weight which may be easily transported over damp or swampy ground and which is provided with its own power plant for operating the harvesting and decorticating apparatus.

It is a further object of this invention to provide a combined harvesting and decorticating apparatus for ramie having means to cut and deliver the ramie stalks to the decorticating apparatus with the result that the ramie is cleaned immediately after cutting.

It is a further object of this invention to provide a decorticating apparatus for ramie having means to grip the stalks and feed the ramie, top ends first, to crushing or scraping rolls at substantially right angles thereto, a second means to grip the stalks at another location and feed the butt ends thereof to a second set of crushing or scraping rolls, and an auxiliary feeding means engaging the butt ends to insure proper introduction thereof to the second set of rolls.

It is a further object of this invention to provide a decorticating apparatus having feeding means which advances the top end of the stalk toward the scraping rolls at a faster rate than the butt end.

It is a still further object of this invention to provide a decorticating apparatus for ramie having a specially designed means for gripping the stalk without injury thereto and feeding the stalk to the scraping rolls.

It is a further object of this invention to provide a decorticating apparatus for ramie incorporating a stripper device for positively stripping the stalks from the second gripping means at the delivery end thus overcoming any tendency of the ramie to stick thereto.

It is a further object of this invention to provide a decorticating apparatus for ramie having delivery conveyors including means to prevent disengagement of the conveyors from the ramie and for reducing friction between the cleaned ramie and the delivery platform or table.

It is a further object of this invention to provide a decorticating apparatus for ramie having crushing or scraping rolls designed to adequately clean the ramie fiber and at the same time to prevent excessive jarring action and to keep vibration at a minimum.

It is a further object of this invention to provide a decorticating apparatus for ramie having crushing or scraping rolls each cooperating with a fixed adjustable breaker strip and knife bar and a fixed adjustable concave apron resulting in a multiple cleaning action by each roll.

It is a further object of this invention to provide an improved method of harvesting and decorticating ramie which results in adequately cleaned fibers comprising a substantial part of the fibers originally present in the plant.

Figure 1:
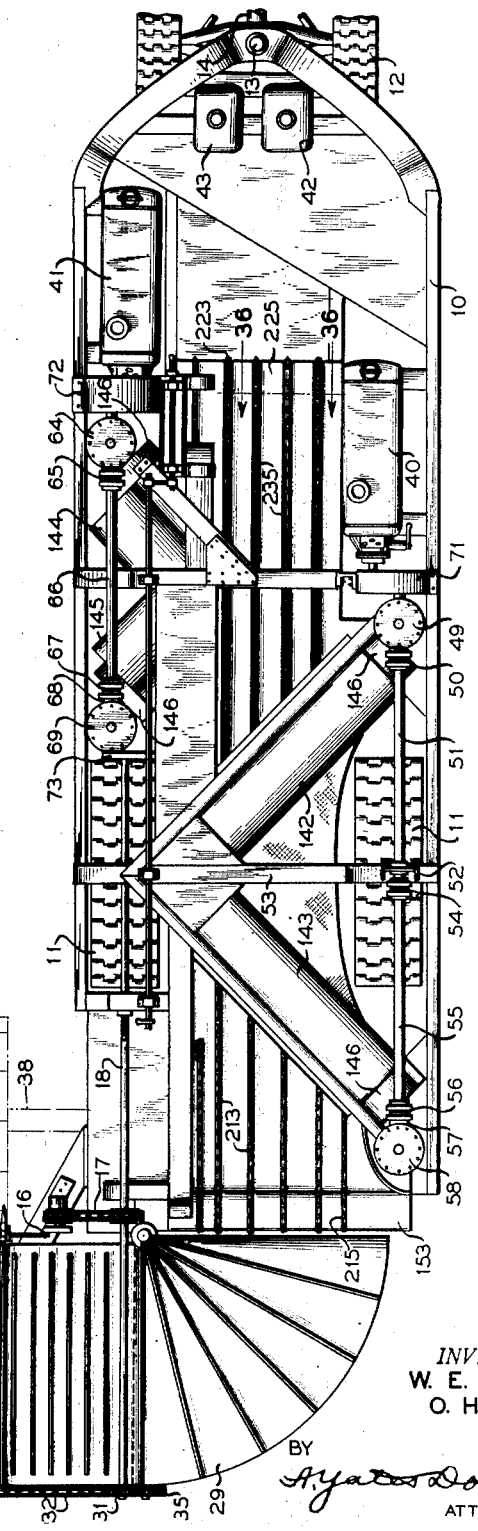
Figure 2:
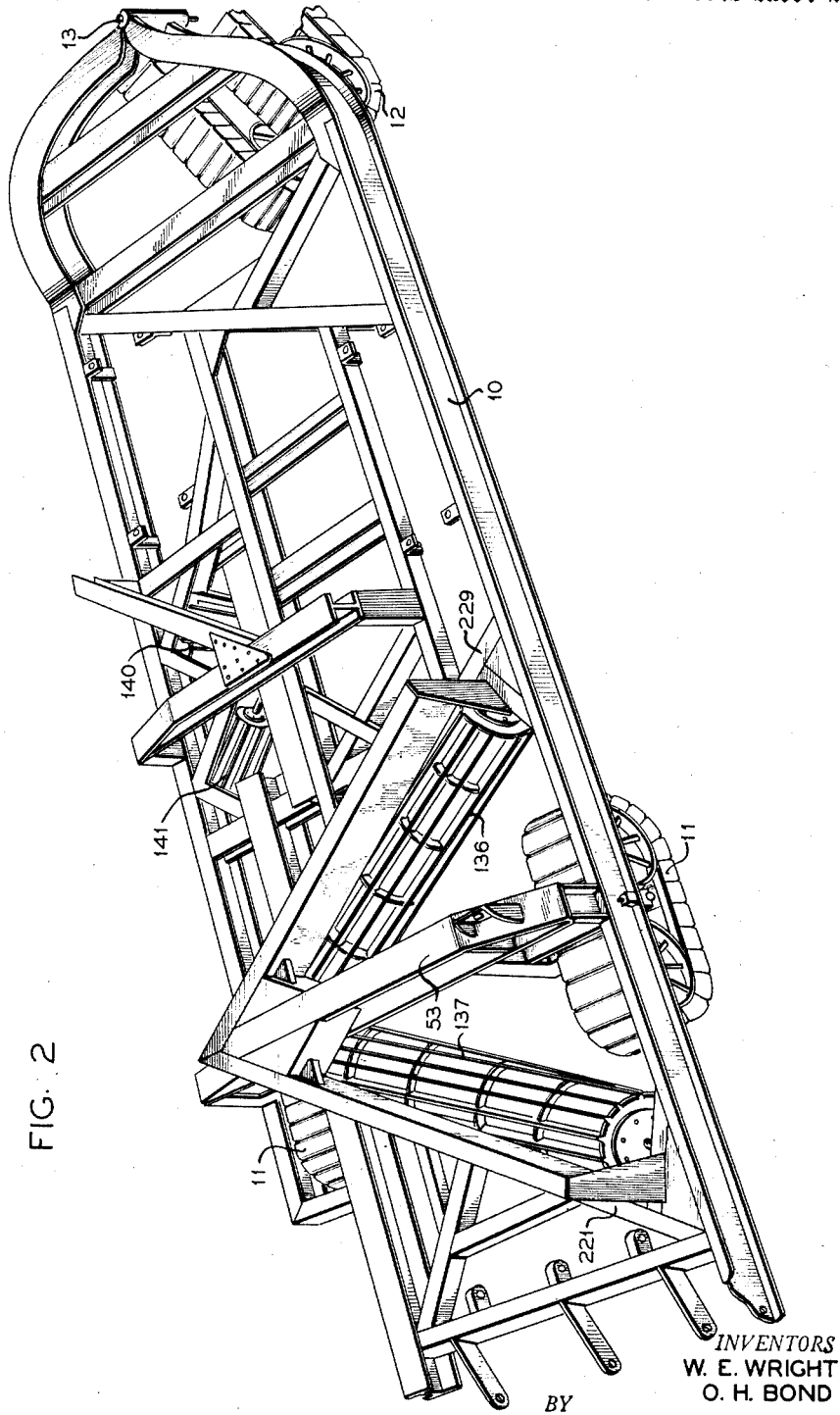
Figure 3:
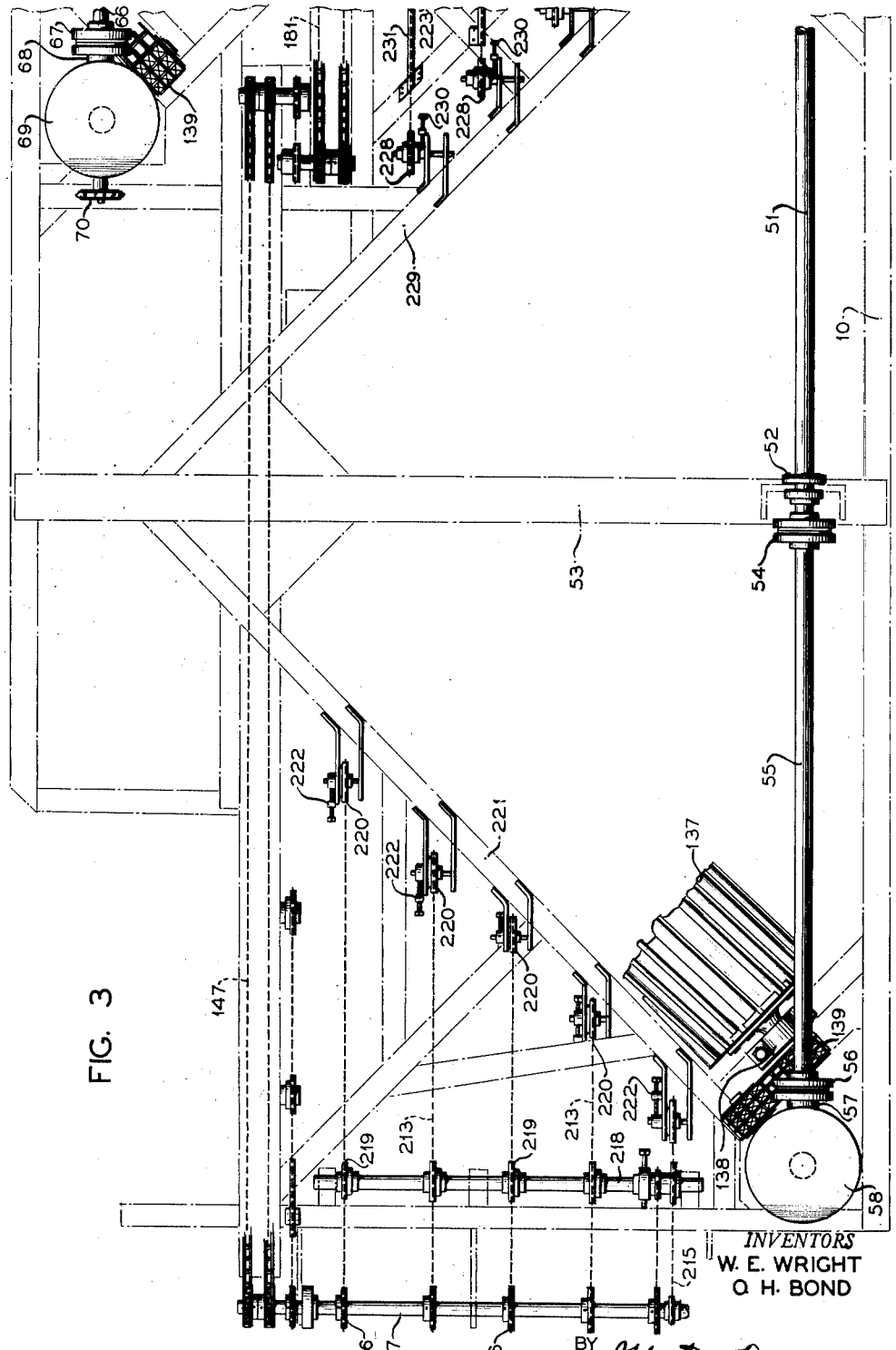
Figure 14:
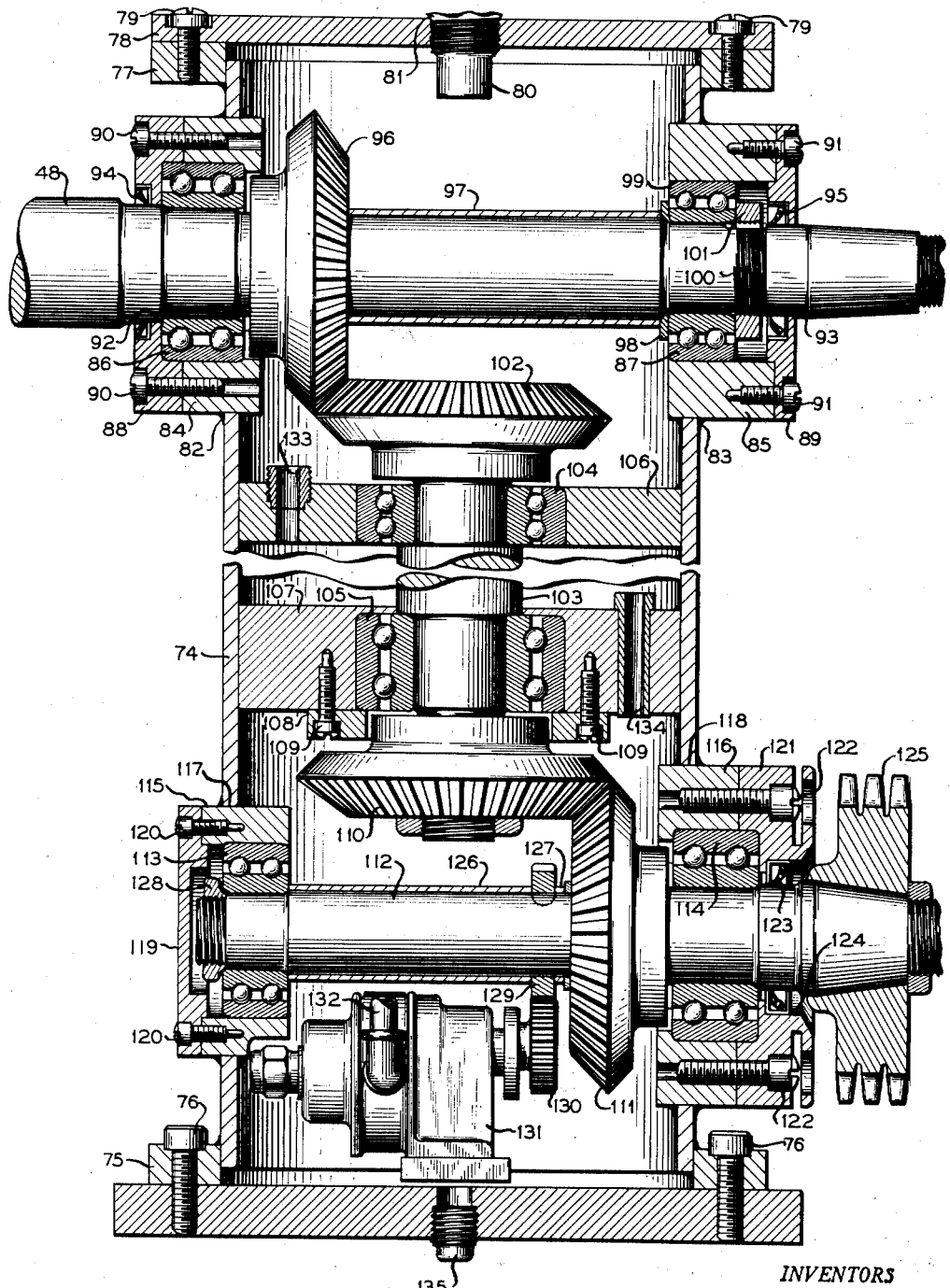
Figure 24:
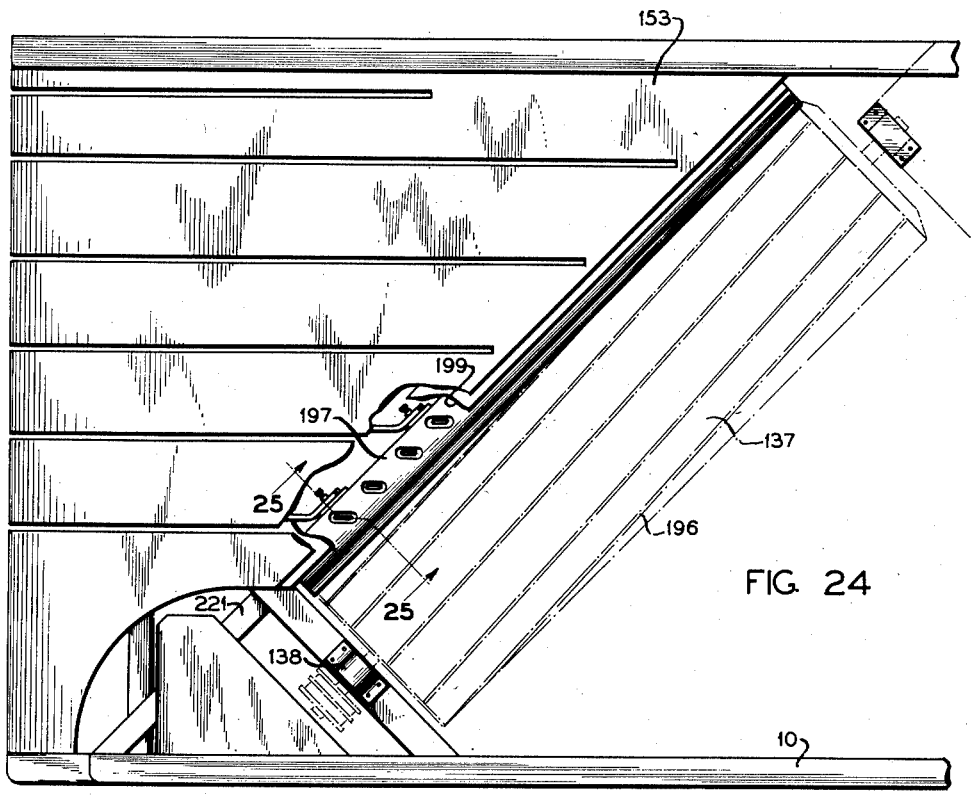
Figure 25:
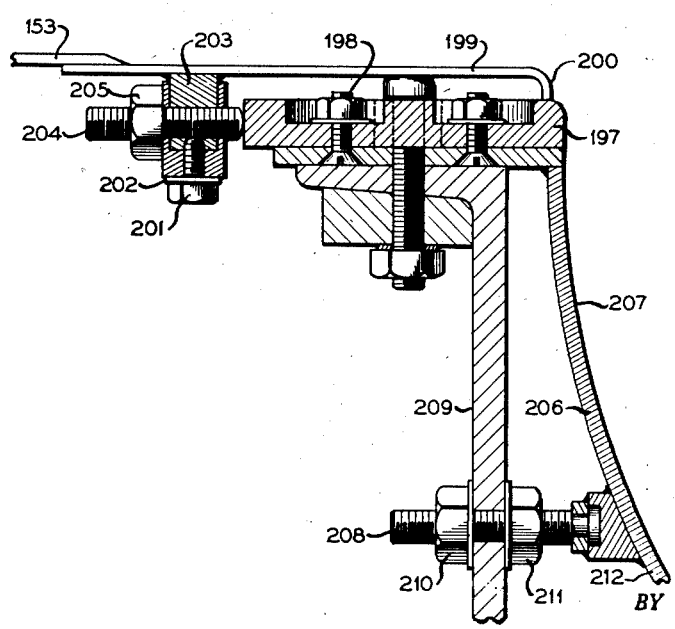
Figure 26:
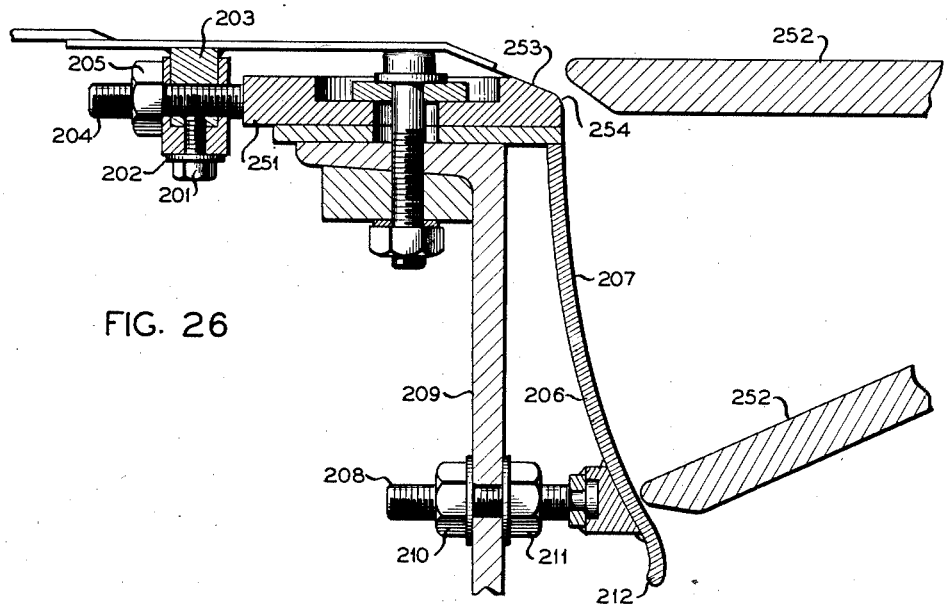
Figure 36:
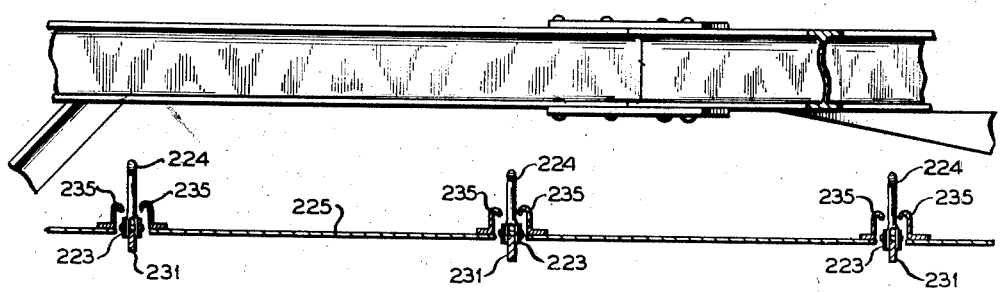
Figure 33:
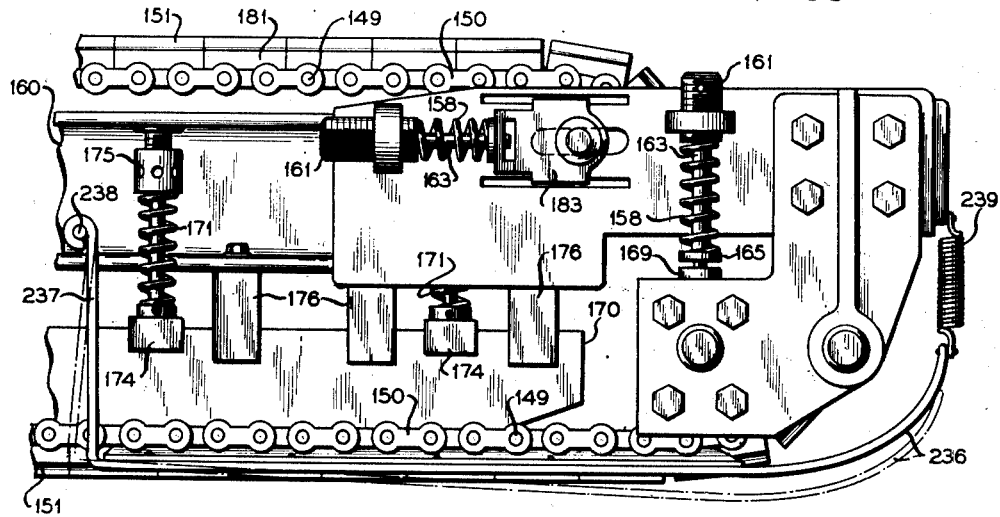
Figure 34:
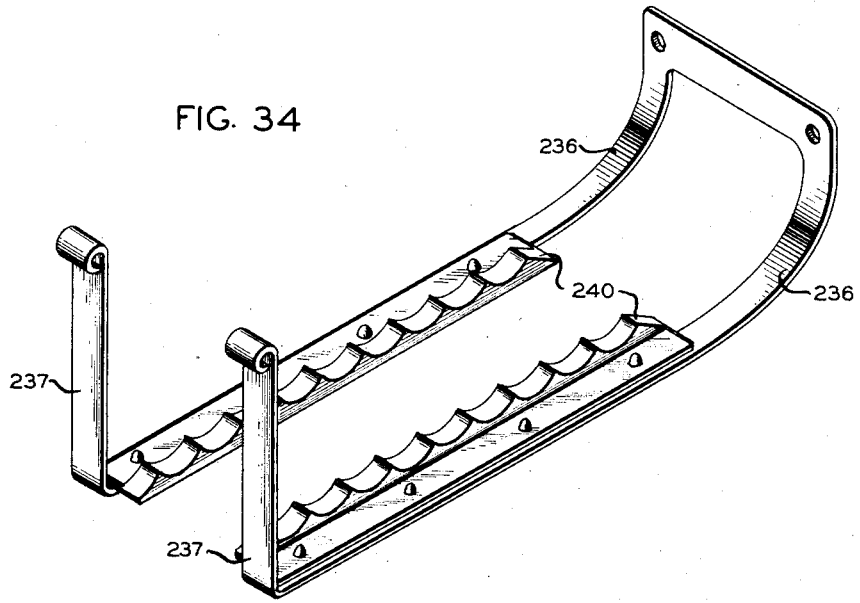

Further objects and advantages of the invention will be apparent from the following description taken in conjunction with the accompanying drawings, wherein:

Fig. 1 is a top plan view of a harvesting and decorticating apparatus for ramie constructed in accordance with this invention;

Fig. 2, a perspective view of the chassis or framework of the device shown in Fig. 1, with certain parts omitted for greater clarity;

Figs. 3 and 4, top plan views of the driving and conveying means of the machine shown in Fig. 1;

Fig. 5, a side elevation of the forward end of the upper conveyor chain flight showing in detail the means for permitting movement of the conveyor to accommodate ramie stalks of varying thicknesses;

Fig. 6, a cross section on the line 6—6 of Fig. 5;

Fig. 7, a cross section on the line 7—7 of Fig. 5;

Fig. 8, a cross section on the line 8—8 of Fig. 5;

Fig. 9, a side elevation of the upper and lower chain flights showing in detail the arrangement and relationship thereof;

Fig. 10, a top plan view of the conveyor shown in Fig. 9;

Fig. 11, a side elevation of an auxiliary conveying means;

Fig. 12, a top plan view of the conveying means shown in Fig. 11;

Fig. 13, a perspective of the chain and associated parts comprising the conveyor of Fig. 11;

Fig. 14, a vertical section of a gear box and power transfer means;

Fig. 15, a side elevation of a crushing or scraping roller;

Fig. 16, a fragmentary end elevation of the crushing or scraping roller shown in Fig. 15;

Figs. 17 to 22, end elevational views of the bulkheads shown in Fig. 15 on the crushing or scraping roll and which serve to support the scraping blades at intervals throughout the length thereof;

Fig. 23, a fragmentary perspective of the blade illustrated in Fig. 15;

Fig. 24, a top plan view of the feed table and first crushing or scraping roll and showing in detail the relationship of the stationary blade to the roll;

Fig. 25, a sectional view in elevation taken on the line 25—25 of Fig. 24, and showing in detail the disposition and contour of the breaker strip, stationary blade and concave apron;

Fig. 26, a view similar to Fig. 25, showing these parts as used in conjunction with the first butt end cleaning roll;

Fig. 27, a fragmentary isometric view showing the details of the gripping and conveying chain;

Fig. 28, a cross section in elevation of the chain shown in Fig. 27;

Fig. 29, a side elevational view showing the details of a feed chain;

Fig. 30, an isometric view of one of the fingers of the feed chain shown in Fig. 29;

Fig. 31, a side elevational view showing the details of a delivery chain;

Fig. 32, an isometric view of one of the fingers of the delivery chain shown in Fig. 31;

Fig. 33, a side elevational view of the delivery end of the second gripping and conveying means showing in detail the vibrating stripper means;

Fig. 34, an isometric view of the vibrating stripper shown in Fig. 33;

Fig. 35, an end elevational view of the conveyor means used in conjunction with the harvester as shown in Fig. 1; and, Fig. 36, a section on the line 36—36 of Fig. 1.

With continued reference to the drawings, there is shown in Figs. 1 and 2 a harvesting and decorticating apparatus in accordance with this invention comprising a frame or chassis 10 mounted on caterpillar tracks or the like 11. The use of caterpillar tracks or other relatively large ground engaging surfaces is necessary in order that the apparatus may be operated over swampy or soft ground since, in view of the necessary weight thereof, were it not for such running gear the machine would frequently become bogged down and useless. The apparatus as shown may be towed along the rows of ramie by any conventional caterpillar tractor or the like and in order that the machine will properly follow the tractor the forward caterpillar tracks 12 are pivotally mounted on the frame 10 by journal bearings 13. A draw bar 14 is provided in order that the machine may be conveniently coupled to the towing tractor.

The harvesting feature of this apparatus as best shown in Figs. 1 and 35 is provided with a reciprocating cutter bar 15 similar to that used in the conventional mowing machine but of course designed to efficiently cut the ramie stalk, this cutter bar being driven from a crank and pitman 16 which receives its power through a chain 17 from a shaft 18 extending longitudinally of the machine. Immediately to the rear of the cutter bar 15 is a conveyor belt 19 which extends over pulleys 20 and 21. Adjacent the pulley 21 are two pulleys 22 and 23 over which conveyor belts 24 and 25 respectively are trained. Belts 24 and 25 are supported at their opposite ends by pulleys 26 and 27 respectively. Adjacent the pulley 26 is a cone shaped pulley 28 which receives a cone shaped belt 29, the opposite end of this belt being carried by cone shaped pulley 30.

Power for driving these conveyor belts is obtained from a sprocket 31 mounted on the end of shaft 18 and over which a chain 32 is trained, this chain engaging sprockets 33, 35 and 36 mounted on pulleys 21, 28 and 27 respectively.

In order to insure that the cut stalks will all fall in the same direction, there is provided a paddle wheel 37 mounted on a shaft 38 which is rotatably driven from shaft 18. As will readily be seen, the rotatable paddle wheel 37 will engage the ramie stalks just prior to their being cut and the paddles thereof will cause the ramie as it is cut to always fall in the same direction, this structure and mode of operation being well known in the harvesting art.

After cutting the ramie stalks fall onto the conveyor belt 19 with the butt ends toward the front of the machine and the top ends toward the rear. Stalks are carried by conveyor 19 until they are engaged between the conveyor belts 24 and 25 to raise the stalks from slightly above ground level to the level of the decorticating apparatus. As the stalks are delivered from belts 24 and 25 they pass on to the conical belt 29 which serves to move the stalks from a position lengthwise of the apparatus to a position laterally thereof. A transfer device of this nature is necessary in order that the ramie stalks will be properly oriented and presented to the gripping and conveying means, which carry them through the decorticating apparatus. In order to properly support the weight of the harvesting apparatus there is provided a wheel 39 which may be mounted outwardly therefrom or to the rear as the case may be.

In order to operate the decorticating and harvesting apparatus, there is provided on the chassis 10 power plants 40 and 41 which may conveniently take the form of gasolene or diesel engines. Fuel for these engines may be carried in tanks 42 and 43 mounted at the forward end of the chassis.

As best shown in Figs. 1, 4 and 3, power is taken from engine 40 through a shaft 44 on which is secured a multiple V-pulley 45. Trained over pulley 45 are a plurality of V-belts 46 which in turn engage a multiple V-pulley 47 mounted on shaft 48 journalled in gear box 49. Shaft 48 extends through gear box 49 and terminates in a flexible coupling 50. From this coupling a shaft 51 extends longitudinally of the machine through an anti-friction bearing 52 mounted in frame cross member 53 and terminates in a flexible coupling 54. To this coupling is secured a shaft 55 also extending longitudinally of the machine and terminating in a flexible coupling 56. Secured to coupling 56 is a shaft 57 which extends into a second gear box 58 which is similar in all respects to gear box 49 the internal structure of which will be presently described.

Power is taken from engine 41 through shaft 59 to which is attached a multiple V-pulley 60. Trained over this pulley are a plurality of V-belts 61 which engage a multiple V-pulley 62 mounted on shaft 63. Shaft 63 is journalled in and extends through gear box 64 terminating in a flexible coupling 65. Secured to the flexible coupling 65 is a shaft 66 extending longitudinally of the machine and terminating in a flexible coupling 67. To this coupling is secured a shaft 68 which extends through gear box 69 terminating in a sprocket 70. Sprocket 70 is engaged by a chain which passes over a sprocket on the end of shaft 18 to deliver power to this shaft for the purpose of driving chain 17 and cutter bar 15 and chain 32 driving the conveyers 19, 25 and 29. Gear boxes 64 and 69 are similar to gear boxes 49 and 58. In order to protect workmen from the belts 46 and 61 these may be covered by guards 71 and 72, respectively, while the chain driving shaft 18 may be covered by a guard 73.

Gear boxes 49, 58, 64 and 69, as best shown in Fig. 14, comprise a tubular casing 74 mounted in vertical position by a lower flange 75 secured to a portion of the chassis 10 by screw threaded fasteners or the like 76. The upper end of the casing 74 is provided with a flange 77 to which may be secured a cover plate 78 by screw threaded fasteners or the like 79. The cover plate 78 may also be provided with a screw threaded plug 80 received in an aperture 81 for the purpose of introducing lubricating oil to the interior of the gear box.

Adjacent the upper end of the casing 74 there are provided apertures 82 and 83 which are diametrically opposite each other and in which are secured by welding or the like anti-friction bearing receiving blocks 84 and 85 respectively. Anti-friction bearings 86 and 87 are received in bores in the blocks 84 and 85 and are retained in position by cover plates 88 and 89 secured to the blocks 84 and 85 by screw threaded fastening means 90 and 91. A shaft 48 extends through an aperture 92 in plate 88 and passes through an aperture 93 in plate 89. In order to prevent leakage of oil or other lubricant around the shaft 48 there may be provided suitable oil seals 94 and 95 mounted in recesses in the plates 88 and 89.

Mounted on shaft 48 within the gear box is a bevel gear 96 which is held in position diametrically of the box by a sleeve 97, one end of which engages the inner side of the gear and the other end of which engages a spacer plate 98 abutting the inner race 99 of anti-friction bearing 87. In order to lock shaft 48 in position and thus assure the proper location of gear 96 there is provided on the shaft 48 a screw threaded portion 100 on which is received a nut 101 engaging the outer surface of the inner race 99 of bearing 87. It will thus be seen that by tightening the nut 101 in place the shaft 48 is secured against longitudinal movement.

Meshing with gear 96 is a second bevel gear 102 secured to a vertical shaft 103 journalled in anti-friction bearings 104 and 105 which are seated in horizontal plates or partitions 106 and 107, respectively. The bearing 105 may conveniently be held in position in the plate 107 by a clamping plate 108 secured to plate 107 by screw threaded fasteners 109. Fixed on the lower end of shaft 103 is a bevel gear 110 meshing with a bevel gear 111 mounted on shaft 112 extending diametrically of the gear box and journalled in anti-friction bearings 113 and 114. Bearings 113 and 114 are received in apertures in blocks 115 and 116, respectively, which are secured in apertures 117 and 118, respectively in the casing 74 as by welding or the like.

The aperture in block 115 is closed by a plate 119 secured in place to the block by screw threaded fasteners 120. Bearing 114 located in the aperture in block 116 is secured in place by a plate 121 which is fixed in position by screw threaded fasteners 122. In order to prevent leakage of oil or other lubricant from the interior of the casing 74, there is provided an oil seal 123 located in a recess 124 in the plate 121 and engaging a portion of the shaft 112. On the outer end of shaft 112 there is provided power take off means in the form of a sprocket 125.

In order to retain the shaft 112 in position and thereby properly maintain the meshing engagement of gears 110 and 111 there are provided on the shaft 112 spacing sleeves 126 and 127, the shaft 112 being locked in place by a nut 128 threadedly received on the end of shaft 112 and engaging the inner race of bearing 113 whereby shaft 112 is secured in position against longitudinal movement.

Also mounted on the shaft 112 is a gear 129 meshing with gear 130 to drive an oil pump 131. Pump 131 is provided with a discharge pipe 132 which extends upwardly through the casing 74 to a location adjacent the top thereof, whereby lubrication oil is discharged in a manner to properly lubricate gears 96 and 102, and the associated bearings for shaft 48. The oil flows downwardly through aperture 133 in plate 106 and aperture 134 in plate 107 to properly lubricate the remaining parts in the casing 74 and thereby return to the lowermost portion thereof to be recirculated by the pump 131. In order to drain the oil from the casing 74 when desired, there is provided in the base 10 thereof a screw threaded plug 135.

Gear boxes 49 and 58 serve to transfer power from engine 40, shafts 48, 51 and 55 to a pair of crushing and scraping rolls 136 and 137, these rolls being journalled in bearings 138 mounted on and secured to a portion of the chassis 10. Rolls 136 and 137 are driven by a chain 139 trained over sprockets 125 on each of the gear boxes and engaging a sprocket mounted on the end of the shaft supporting each roll.

A second pair of cleaning and scraping rolls 140 and 141 receive their power from sprockets 125 associated with gear boxes 64 and 69. In order to properly protect the operator or other workman on the machine, rolls 136 and 137 may be covered by guards 142 and 143 respectively, while rolls 140 and 141 may be covered by guards 144 and 145 respectively. Likewise for protective purposes the driving chains 139 may be covered by guards 146.

In view of the fact that conventional feed rolls cannot be used due to the tendency of ramie to wind thereon there is provided a gripping and conveying means to receive the ramie from conveyor 29 and pull the stalks through the decorticating apparatus. This gripping means comprises a pair of upper and lower chains 147 and 148, these chains being trained over sprockets at either end thereof and receiving driving power in a manner to be presently described. Chains 147 and 148 comprise as best shown in Fig. 27 a plurality of links pivoted together by pintle pins 149 and longitudinal side members 150. These chains are provided with gripping blocks 151 formed of rubber or the like, the gripping surface thereof being provided with flutes 152, in order to more firmly grip the ramie stalks therebetween.

As best shown in Fig. 9 the chains 147 and 148 come together at the feeding end of the machine adjacent the conveyor 29 and meet at a point on a level with a feed table 153. In order that the entrance of the ramie stalks between the chains 147 and 148 will be easily effected and further in order to accommodate stalks of different diameter, the upper chain 147 is supported adjacent the point of its engagement with lower chain 148 by a pivoted link 154, to which is pivotally secured a second link 155 carrying a chain engaging shoe 156. Link 155 is supported at its opposite end by a pivot pin 157.

In order that the chain 147 will properly yield to the entrance of the ramie stalks between this chain and chain 148, shoe 156 is resiliently urged against the back of chain 147 by springs 158 and 159, the details of which are best shown in Figs. 5 and 6. Springs 158 and 159 are adjustably supported on a longitudinal member 160 by adjusting screws 161 and 162. Rods 163 and 164 slidably received in adjusting screws 161 and 162 have secured thereto adjacent their lower ends collars 165 and 166 the lower ends 167 of the rods 163 and 164 being rounded to engage in cup shape depression 168 in ears 169 secured to links 154. In this manner the springs 158 and shoes 159 resiliently urge the links 154, links 155 and shoes 156 against the back of chain 147 to provide a yielding engagement at the point of entrance between chains 147 and 148.

The engagement of blocks 151 on chains 147 and 148 is maintained throughout the length of travel thereof by backing or pressure bars 170 which as best shown in Figs. 5, 7, and 9 are resiliently urged into engagement with the back of chain 147. The resilient means for accomplishing this function is best shown in Fig. 7 and comprises a series of springs 171 received on rods 172 slidably mounted in screw threaded members 173 fixed to longitudinal member 160. The lower ends of springs 171 engage collars 174 fixed to the lower ends of rods 172 the collars 174 in turn engaging bars 170. The upper ends of springs 171 engage the lower surfaces of adjusting nuts 175 which are threadably received on the members 173. It will thus be seen that by adjustment of nuts 175 the degree of tension in the springs 171 may be changed in order to obtain any desired pressure between the blocks 151 on chains 147 and 148.

As best shown in Figs. 5 and 8, backing bars 170 are supported and guided for vertical movement by a series of blocks 176 secured to longitudinal member 160 by screw threaded fasteners or the like 177. Each of the blocks 176 is provided with a pair of slots 178 which are adapted to slidably receive the backing bars 170 and thus permit the bars to move vertically while retaining their relationship to the chain 147.

While the backing bars 170 have been shown as individually movable it is to be understood that these bars could be assembled as a unit and moved together in performing their function.

In order to maintain the ramie engaging portion of the lower chain 148 in position and prevent sagging thereof a fixed supporting bar 179 is provided to engage the back of chain 148 during the time in which ramie stalks are engaged between the blocks 151 on chains 147 and 148. Also, in order to prevent sagging of the lower flight of chain 148 a supporting bar 180 is provided.

Chains 147 and 148 extend from a point adjacent the entrance or rear end of the machine to a point beyond cleaning rolls 136 and adjacent the cleaning rolls 141. At this point a second pair of gripping and conveying chains 181 and 182 are provided to receive the partially cleaned ramie stalks from chains 147 and 148 to convey the butt end portions of the ramie through cleaning rolls 141 and 140. For this purpose chains 181 and 182 are spaced laterally from chains 147 and 148 and overlap the delivery ends thereof in order to properly receive the ramie stalks from chains 147 and 148. Chains 181 and 182 are similar in every respect to chains 147 and 148, there being provided resilient take up means 183 to maintain the proper tension in both sets of chains.

Driving power for chains 147, 148, 181 and 182 is received from engine 41 through power take-off shaft 59 and V-belt 184 which engages a V-pulley 185 mounted on shaft 186. Shaft 186 extends into a speed reducing gear box 187, the output of which is transferred by a chain 188 to shaft 189 carrying a sprocket engaging chain 182 and power from shaft 189 is also transferred by means of a chain 190 to a sprocket 191 engaging chain 181. Chains 147 and 148 are driven from chains 181 and 182 by a chain 192.

It will therefore be understood that by the provision of the above described gripping and pulling means the problem of successfully conveying ramie stalks through the decorticating apparatus has been solved in a relatively simple and efficient manner which results in properly conveying the stalks without injury thereto and without any danger of clogging the machine such as would be present were conventional feed rolls utilized.

In order to properly clean the ramie fiber there have been provided in this apparatus two pairs of scraping rolls, rolls 136 and 137 serving to clean the major top portion of the stalk while rolls 140 and 141 serve to clean the butt end portion of the stalk. These rolls are intended to rotate at a speed of approximately 600 to 700 R. P. M. and are provided with scraping blades throughout the circumference thereof which engages and scrapes the unwanted material from the ramie fiber as the stalk passes between a stationary blade and the scrapers of the roll. The rolls are similarly constructed except for the fact that the scrapers are arranged spirally on each roll and the direction of this spiral depends on the direction of rotation of the roll, the purpose of which will presently be more fully explained.

As best shown in Figs. 2 and 15 to 22, the rolls may conveniently take the form of a hollow cylindrical shell 193 having bulkhead members 194 connecting the shell with a shaft 195' which is journalled in bearings 138 to rotatably support the roll. As will be seen from the drawings, there are a plurality of bulkhead members 194, each of which is provided with slots 195 adapted to receive scraper blades 196. These blades extend throughout the length of each roll and are spirally disposed thereon.

Located adjacent the rolls 136 and 137 as best shown in Figs. 24 and 25 are stationary or fixed blades 197 which may be locked in adjusted position relative to the roll by means of screw threaded bolts 198. The blade 197 is adjusted in such a manner that the clearance between the edge of this blade and the blades 196 on the roll varies from one end to the other, the clearance at the inner end of the roll being approximately .030 inch and at the outer end of the roll approximately .020 inch. This variation in clearance is necessary due to the change in diameter from butt end to the top of the stalk.

Roll 137 is adapted to rotate in a counterclockwise direction when viewed from the driven end thereof and roll 136 rotates clockwise when viewed from the driven end. Roll 141 rotates clockwise when viewed from the driven end and roll 140 counterclockwise. For this reason, the spiral formation of the scraper blades 196 must be in accordance with the direction of rotation for that particular roll. The scrapers on roll 137 are given a left hand twist when viewed from the driven end, while the scrapers on roll 136 are given a right hand twist, the scrapers on roll 141 having a right hand twist and the scrapers on roll 140 a left hand twist.

The purpose of the spiral arrangement of the scrapers on the rolls is two-fold. First, by making the amount of twist over the length of each roll approximately the distance between scraper blades, the ramie stalk is at all times substantially engaged between some portion of one rotating blade and the stationary blade 197. Consequently, as each blade comes into engagement with the ramie stalk there is no jar or excessive vibration since a preceding blade is still in engagement with a preceding stalk and therefore there is a steady load on the roll and not a series of impacts as there would be if the rotating blades were not spirally arranged. Secondly, the spiral arrangement is such that the stalks tend to be pulled away from the gripping or pulling means 147, 148, 181 and 182 and consequently the stalks are cleaned by the whole length of the roll rather than all tending to bunch together at one portion thereof, this action making it necessary for the gripping and pulling means to pull the stalks lengthwise of the stationary blade 197 rather than the stalks tending to become bunched at the inner end of the roll as would be the case if the twist were in the opposite direction.

The cleaning action of the rotary blades 196 and stationary blades 197 is materially improved by the provision of a breaker strip 199 disposed over the stationary blade 197 and terminating in a curved edge portion 200 adjacent but slightly retracted from the edge of blade 197. Strip 199 may be conveniently secured in place by the engagement of a screw threaded fastener 201 passing through a portion of the chassis 202 and engaging a boss 203 secured to the under side of strip 199. Also mounted in chassis portion 202 is a screw threaded adjusting bolt 204 having a lock nut 205 thereon to assist in properly adjusting stationary blade 197. The action of breaker strip 199 is such that when a ramie stalk passes thereover and is engaged between rotary scrapers 196 and stationary blades 197 the curved edge 200 serves to split the stalk by bending it, thus breaking but not tearing the outer bark and other woody portions which it is desired to remove. This treatment facilitates greatly the action of the rotary and stationary blades.

In order to further augment the cleaning action of the rotary and stationary blades, there is provided directly below the stationary blades a concave apron 206, the surface 207 of which adjacent the roll is provided with a curvature substantially concentric with the path of travel of the rotary scraper blades. The clearance between surface 207 and the rotary scraper blades may be conveniently adjusted by a screw threaded member 208 passing through a portion of the chassis 209 and being secured in position by lock nuts 210 and 211. During the cleaning operation in addition to the material removed by engagement of the ramie stalk between the rotary blades and the stationary blade 197, additional cleaning thereof is accomplished due to the fact that the ramie stalk extends from the edge of blade 197 downwardly and over the lower edge 212 of the stationary apron, the portion between edge 212 and the edge of the stationary blade 197 being subjected to the action of the rotary blades 196 to complete the cleaning of the fiber at this stage. The provision of the breaker strip 199 and concave apron 206 is a significant part of the invention and materially contributes to the efficient and thorough cleaning of the ramie fiber.

In order to properly present the major top portion of the ramie stalk to the first cleaning roll 137 there is provided a plurality of conveyor or feed chains 213 having ramie engaging fingers 214 running in slots in the top portion of feed table 153. In view of the fact that the tip of the stalk should engage roll 137 and stationary knife 197 at substantially right angles thereto, the outer conveyor chain 215 is arranged to travel at a slightly greater speed than the remaining chains 213, the ratio of speeds being approximately 3 to 2. Chains 213 and 215 are trained over sprockets 216 on a shaft 217 journalled in bearings on the chassis of the machine, the power for operating chains 213 and 215 being received through sprockets on shaft 217 from the lower gripping and feeding chain 148. A countershaft 218 having sprockets 219 thereon engaging chains 213 and 215 is provided in order to guide these chains in the proper path. The inner ends of chains 213 and 215 are trained over sprockets 220 secured to diagonal member 221 mounted on the chassis and means 222 may be provided in order to maintain the proper tension in chains 213 and 215.

In order to convey the cleaned upper portion of the ramie stalk away from the second cleaning roll 136 to a point of delivery adjacent the forward end of the machine there is provided a plurality of conveyor chains 223 having ramie engaging fingers 224 running in slots in a delivery table 225 extending from roll 136 to a point slightly beyond the delivery end of second gripping chains 181 and 182 where the cleaned ramie is discharged from the machine. Chains 223 are trained over sprockets 226 on a shaft 227 journalled in bearings on the chassis of the machine. The opposite ends of chains 223 are trained over sprockets 228 secured to diagonal member 229 mounted on the chassis and means 230 may be provided in order to maintain the proper tension in chains 223. To prevent sagging of the upper chain flight and disengagement from the ramie by fingers 224 there are provided backing bars or shoes 231 for each chain which engages the under side of the upper chain flight to support the same. Power for chains 223 is received from shaft 189 through a chain 232 mounted on a shaft 233. Shaft 233 carries sprockets 234 for drivingly engaging chains 223.

The cleaned ramie fiber which is delivered by chains 223 usually has present therein certain gums and resins which would tend to increase the friction between the ramie and the delivery table 225. For this reason and in order to maintain a portion of the ramie out of engagement with the delivery table there is provided at each side of the slots in which the chain travels rails 235 provided with a curved upper surface to reduce friction between the rails and the ramie, the rails 235 being located closely adjacent the fingers 224 in order to prevent any tendency for strands of the ramie to drop through the slots in the table.

It has also been found that due to the presence of gums and resins in cleaned ramie fiber there is a tendency for the fiber to stick or adhere to the rubber blocks 151 on the second gripping chain 181. In order to strip the ramie from the blocks 151 there has been provided as best shown in Figs. 33 and 34 a vibrating stripper which comprises a generally U-shaped member 236 having upstanding ears 237 which are pivoted at 238 to longitudinal member 160. U-shaped member 236 straddles the blocks 151 on chain 181, the forward end of member 236 being held in elevated position by tension springs 239. The upper surface face of each side of member 236 is provided with a block 240 having a corrugated upper surface which is adapted to engage the links of chain 181 under the action of springs 239. As chain 181 moves this causes member 236 to have a vibrating motion about pivot 238 as the links of the chain ride upwardly on the peaks of the corrugations on members 240. By this extremely simple expedient the ramie is very effectively stripped from the rubber blocks 151, thus precluding any tendency for the ramie to be carried around the end of chain 181 and thus back into the machine. This problem is not present with gripping chains 147 and 148 since the portion of the ramie gripped between these chains is uncleaned and therefore the gums and resins cannot cause adhesion between the block 151 and the ramie. It is therefore not necessary to provide a stripping means at the delivery ends of chains 147 and 148.

In presenting the butt ends of the ramie stalks to cleaning roll 141 a cleaned portion of the stalk is gripped by chains 181 and 182 which results in the butt end portion tending to drag behind these chains due to the limp nature of the fiber. As a consequence it has been found necessary to provide an auxiliary feeding means to assist in properly presenting the butt end portions to roll 141 and as shown in Figs. 11, 12 and 13 this auxiliary feeding means may take the form of a chain positioned adjacent the delivery end of the first gripping and feeding chains 147 and 148 and extending to a point slightly beyond roll 141. Auxiliary feed chain 241 is trained over a plurality of sprockets 242, one of the sprockets having secured thereto a gear 243, this gear and sprocket being journalled on a shaft 244 mounted in spaced upright plate-like members 245. Also mounted in members 245 is a second shaft 246 having thereon a gear 247 meshing with gear 243, there being associated with gear 247 a sprocket 248 which engages the second gripping chain 181 to supply power for operation of auxiliary feed chain 241 at a slightly greater speed than chain 181. Chain 241 is provided with a plurality of ramie engaging fingers 249 which may conveniently be provided with a relatively flexible projecting portion 250 formed of leather or the like. In operation, the lower flight of chain 241 is closely adjacent the ramie as it is transferred from chains 147 and 148 to chains 181 and 182 and at this point fingers 250 engage the butt end portions causing them to travel at a slightly greater speed than chains 181 and 182 and thus properly present these butt ends to cleaning roll 141.

It has further been found necessary to utilize a slightly modified stationary knife 251 for cooperation with the rotary blades 252 on roll 141. This modification comprises bevelling the edge of blade 251 at 253 in order that the point of engagement 254 between the stationary knife 251 and the ramie will be slightly below the center line of roll 141. This results in the rotary blades 252 having a tendency to pull the ramie down between knife edge 254 rather than acting to push the ramie away as would be the case if edge 254 were either at or slightly above the center line of the roll 141. The remainder of the structure used in conjunction with stationary knife 251 is similar to that shown in Fig. 25 as used in conjunction with the other cleaning rolls.

In operation, the machine is towed along the rows of ramie in the field by a tractor and as it moves along ramie stalks are cut by the cutter bar 15, the stalks falling onto conveyor 19, all laying in the same direction under the action of paddles 37. The stalks are carried along conveyor 19 to conveyor 24 on which they are carried upwardly to the level of the feeding table 153 where they are delivered to the conical conveyor 29 which moves the stalks from a position lengthwise of the machine to a position laterally thereof and onto the feeding table 153. At this point the stalks are engaged near the butt ends thereof between the blocks 151 of chains 147 and 148 and at the same time the remaining portion of the stalk is engaged by upstanding ears 214 on conveyor chains 213 and 215.

As the stalks progress toward the roll 137 and stationary knife 197 the portion thereof engaged by chain 215 will move slightly faster than the portion engaged by chains 213. As the top end of the stalk comes in contact with the revolving roll 137 the stalk is carried down between knife 197 and the knife blades 196 on the roll 137 and a scraping action takes place which cleans the undesired material therefrom. Due to the slightly increased speed of chain 215 the tip end of the stalk will be presented to roll 137 substantially at right angles to the axis thereof.

As the stalk progresses between cleaning roll 137 and knife 197 the butt end portion is being carried along by gripping means 147 and 148 until the end of knife 197 is reached, at which time the partially clean stalk will be carried away from the roll 137 and will engage between roll 136 and its associated stationary knife, after which the stalk will be pulled upwardly to further clean the same. Shortly after engagement between roll 136 and its associated knife the butt end portion will be released from gripping means 147 and 148 and another portion of the stalk will be engaged by gripping and pulling means 181 and 182 which will continue to pull the stalk between roll 136 and its associated knife to complete the cleaning of the major top portion of the stalk.

Upon engagement of the stalk by gripping mans 181 and 182 the butt end portion will be engaged by projecting portions 250 on auxiliary feed chain 241 to carry these portions along and properly present the same to butt end cleaning roll 141 and associated knife 251, the cleaning action of the butt end portion taking place in a manner similar to that described above for the top portion. The cleaning of the butt end portion is completed by being pulled between roll 140 and its associated knife.

As the major portion of the stalk leaves roll 136 and associated knife, it is progressively engaged by conveyor chains 223 which carry the cleaned fiber forwardly of the machine and after the fiber is released by gripping means 181 and 182 it may be disposed of in any convenient manner as by other conveyor means, loading manually onto a truck or other vehicle, or some binding means may be employed if desired.

It will thus be seen that there is provided by this invention a relatively simple harvesting and decorticating apparatus which is adapted to be operated in the climate and under the soil conditions in which ramie must be grown and in which the ramie is cut and immediately cleaned in order to produce the greatest possible percentage of commercially usable fiber. It also appears clear that there has been provided an apparatus that requires practically no manual labor, the only such labor necessary being that of removing the cleaned fiber from the machine and this obviously can be of the unskilled variety.

It will be obvious to those skilled in the art that various changes may be made in the invention without departing from the spirit and scope thereof and therefore the invention is not limited by that which is shown in the drawings and described in the specification but only as indicated in the appended claims.

We claim:

1. A decorticator for ramie comprising in combination a chassis, running gear on said chassis, conveyor means constructed and arranged to convey ramie stalks to a feeding table on said chassis, a pair of rotatable scraping rolls mounted at right angles to each other in the path of movement of the upper portions of said stalks, stationary scrapers adjacent each roll and cooperating therewith to scrape bark and other unwanted material from said stalks, a breaker strip positioned over said scraper, the edge of said breaker strip being slightly spaced from the edge of said scraper whereby ramie in passing over the edge of said strip will bend thus resulting in breaking the bark to facilitate removal thereof by said roll and said scraper, a concave apron positioned below said stationary scraper, the curvature of the surface thereof adjacent said roll being substantially concentric with said roll whereby ramie will be stretched between the edge of said scraper and the lower edge of said concave apron, the portion therebetween being subjected to the action of said roll to further clean the stalk, a second pair of scraping rolls rotatably mounted at right angles to each other, said second pair of rolls being spaced laterally and longitudinally from said first pair of rolls, a stationary scraper adjacent each roll of said second pair and cooperating therewith to scrape bark and other unwanted material from the butt end portions of said stalks, the scraper adjacent the first roll of said second pair being bevelled in such a manner that the edge of said scraper is below the center line of said roll to facilitate feeding of the butt end portions between said roll and said scraper, a breaker strip and a concave apron associated with said scraper, gripping and pulling means extending longitudinally of said chassis from a point adjacent said feeding table to a point adjacent said second pair of rolls, said gripping means being constructed and arranged to grip said stalks adjacent the butt ends thereof and to pull the upper portions of said stalks between the stationary scrapers and rolls of said first pair, conveyor means adjacent said gripping and pulling means and cooperating therewith to feed said stalks to said first pair of rolls, a second gripping and pulling means spaced laterally from said first gripping and pulling means and extending longitudinally of said chassis from a point adjacent the end of said first gripping and pulling means to a point of delivery, said second gripping and pulling means being constructed and arranged to engage said stalks upon release by said first gripping and pulling means at a point laterally removed from the point of first enagement and to pull the butt end portions of said stalks between the stationary scrapers and rolls of said second pair of rolls to clean the butt end portions thereof, auxiliary feeding means positioned adjacent the point of transfer from said first gripping and pulling means to said second gripping and pulling means and comprising a conveyor having members thereon provided with flexible ramie engaging projections, said auxiliary conveying means being operated at a slightly greater speed than said second gripping and pulling means whereby the butt end portions are properly presented to said second pair of scraping rolls, a stripping means adjacent the point of delivery from said second gripping and pulling means and comprising a U-shaped pivotally mounted member with the arms thereof positioned one on each side of the gripping and pulling means, the upper surface of each arm being provided with means cooperating with said gripping and pulling means to cause said stripper means to vibrate, said stripper means being resiliently urged against said gripping and pulling means, a delivery table, conveyer means adjacent said second gripping and pulling means and cooperating therewith to deliver the clean stalks from the apparatus, rails extending upwardly from said delivery table adjacent said last-named conveyor constructed and arranged to engage the cleaned ramie and reduce friction between said ramie and the delivery table, and power means on said chassis constructed and arranged to operate said gripping and pulling means, said scraping means and said conveyer means.

2. A decorticator for ramie comprising in combination a chassis, running gear on said chassis, conveyor means constructed and arranged to convey ramie stalks to a feeding table on said chassis, a pair of rotatable scraping rolls mounted at right angles to each other in the path of movement of the upper portions of said stalks, stationary scrapers adjacent each roll and cooperating therewith to scrape bark and other unwanted material from said stalks, a breaker strip positioned over said scrapers, the edge of said breaker strip being slightly spaced from the edge of said scraper whereby ramie in passing over the edge of said strip will bend thus resulting in breaking the bark to facilitate removal thereof by said roll and said scraper, a concave apron positioned below said stationary scraper, the curvature of the surface thereof adjacent said roll being substantially concentric with said roll whereby ramie will be stretched between the edge of said scraper and the lower edge of said concave apron, the portion therebetween being subjected to the action of said roll to further clean the stalk, a second pair of scraping rolls rotatably mounted at right angles to each other, said second pair of rolls being spaced laterally and longitudinally from said first pair of rolls, a stationary scraper adjacent each roll of said second pair and cooperating therewith to scrape bark and other unwanted material from the butt end portions of said stalks, the scraper adjacent the first roll of said second pair being bevelled in such a manner that the edge of said scraper is below the center line of said roll to facilitate feeding of the butt end portions between said roll and said scraper, a breaker strip and a concave apron associated with said scraper, gripping and pulling means extending longitudinally of said chassis from a point adjacent said feeding table to a point adjacent said second pair of rolls, said gripping means being constructed and arranged to grip said stalks adjacent the butt ends thereof and to pull the upper portions of said stalks between the stationary scrapers and rolls of said first pair, conveyor means adjacent said gripping and pulling means and cooperating therewith to feed said stalks to said first pair of rolls, a second gripping and pulling means spaced laterally from said first gripping and pulling means and extending longitudinally of said chassis from a point adjacent the end of said first gripping and pulling means to a point of delivery, said second gripping and pulling means being constructed and arranged to engage said stalks upon release by said first gripping and pulling means at a point laterally removed from the point of first engagement and to pull the butt end portions of said stalks between the stationary scrapers and rolls of said second pair of rolls to clean the butt end portions thereof, auxiliary feeding means positioned adjacent the point of transfer from said first gripping and pulling means to said second gripping and pulling means and comprising a conveyer having members thereon provided with flexible ramie engaging projections, said auxiliary conveying means being operated at a slightly greater speed than said second gripping and pulling means whereby the butt end portions are properly presented to said second pair of scraping rolls, a stripping means adjacent the point of delivery from said second gripping and pulling means and comprising a U-shaped pivotally mounted member with the arms thereof positioned one on each side of the gripping and pulling means, the upper surface of each arm being provided with means cooperating with said gripping and pulling means to cause said stripper means to vibrate, said stripper means being resiliently urged against said gripping and pulling means, a delivery table, conveyer means adjacent said second gripping and pulling means and cooperating therewith to deliver the clean stalks from the apparatus, and power means on said chassis constructed and arranged to operate said gripping and pulling means, said scraping means, and said conveyer means.

3. A decorticator for ramie comprising in combination a chassis, a conveyer means constructed and arranged to convey ramie stalks to a feeding table on said chassis, means on said chassis for cleaning the upper portions of said stalks, a second means on said chassis for cleaning the butt end portions of said stalks, said cleaning means comprising rotatably mounted rolls, each roll having a plurality of blades on the circumference thereof, said blades being spirally arranged throughout the length of said roll, the twist of said spiral being substantially equal to the distance between adjacent blades, a stationary blade adjustably mounted adjacent each roll with the clearance between said stationary blade and the blades on said roll varying from one end thereof to the other in order to accommodate the varying diameters of said stalks from butt end to tip, the spiral arrangement of said rotating blades resulting in one blade always being in engagement with a stalk thus minimizing jar and vibration, a breaker strip positioned over each of said stationary blades, the edge of said breaker strip being slightly spaced from the edge of said blade whereby ramie in passing over the edge of said strip will bend thus resulting in breaking the bark to facilitate removal thereof by said roll and said blade, a concave apron positioned below said stationary blade, the curvature of the surface thereof adjacent said roll being substantially concentric with said roll whereby ramie will be stretched between the edge of said blade and the lower edge of said concave apron, the portion therebetween being subjected to the action of said roll to further clean the stalk, gripping means for engaging said stalks adjacent the butt ends thereof and for pulling the upper portions of said stalks through said first cleaning means, a second gripping means for engaging said stalks at a point removed from the point of said first engagement and for pulling said butt end portions through said second cleaning means, auxiliary feeding means positioned adjacent the point of transfer from said first gripping and pulling means to said second gripping and pulling means and comprising a conveyor having members thereon provided with ramie engaging projections, said auxiliary conveying means being operated at a slightly greater speed than said second gripping and pulling means whereby the butt end portions are properly presented to said second cleaning means, a stripping means adjacent the point of delivery from said second gripping and pulling means and comprising a U-shaped pivotally mounted member with the arms thereof positioned on each side of the gripping and pulling means, the upper surface of each arm being provided with means cooperating with said gripping and pulling means to cause said stripper means to vibrate, said stripper means being resiliently urged against said gripping and pulling means, and power means on said chassis constructed and arranged to operate said gripping and pulling means, said cleaning means, and said conveyer means.

4. A decorticator for ramie comprising in combination a chassis, conveyer means constructed and arranged to convey ramie stalks to a feeding table on said chassis, means on said chassis for cleaning the upper portions of said stalks, a second means on said chassis for cleaning the butt end portions of said stalks, said cleaning means comprising rotatably mounted rolls, each roll having a plurality of blades on the circumference thereof, said blades being spirally arranged throughout the length of said roll, the twist of said spiral being substantially equal to the distance between adjacent blades, a stationary blade adjustably mounted adjacent each roll with the clearance between said stationary blade and the blades on said roll varying from one end thereof to the other in order to accommodate the varying diameter of said stalks from butt end to tip, the spiral arrangement of said rotating blades resulting in one blade always being in engagement with a stalk, thus minimizing jar and vibration, gripping means for engaging said stalks adjacent the butt ends thereof and for pulling the upper portions of said stalks through said first cleaning means, a second gripping means for engaging said stalks at a point removed from the point of said first engagement and for pulling said butt end portions through said second cleaning means, auxiliary feeding means positioned adjacent the point of transfer from said first gripping means to said second gripping means and comprising a conveyor having members thereon provided with ramie engaging projections, said auxiliary conveying means being operated at a slightly greater speed than said second gripping means whereby the butt end portions are properly presented to said second cleaning means, a stripping means adjacent the point of delivery from said second gripping means, a delivery table, conveyer means adjacent said second gripping means and cooperating therewith to deliver the clean stalks from the apparatus, rails extending upwardly from said delivery table adjacent said last-named conveyer constructed and arranged to engage the cleaned ramie and reduce friction between said ramie and the delivery table, and power means on said chassis constructed and arranged to operate said gripping and pulling means, said cleaning means and said conveyer means.

5. A decorticator for ramie comprising in combination a chassis, running gear on said chassis, conveyor means constructed and arranged to convey ramie stalks to a feeding table on said chassis, a first scraping roll rotatably mounted on said chassis, a stationary scraper adjacent said roll and cooperating therewith to scrape bark and other unwanted material from said stalks, a second scraping roll rotatably mounted on said chassis, a stationary scraper adjacent said second roll and cooperating therewith to scrape further material from said stalk, a third scraping roll rotatably mounted on said chassis and spaced laterally and longitudinally from said second roll, a stationary scraper adjacent said third roll and cooperating therewith to scrape bark and other unwanted material from the butt end portion of said stalks, a fourth scraping roll rotatably mounted on said chassis adjacent said third scraping roll, a stationary scraper adjacent said fourth roll and cooperating therewith to scrape additional material from said butt end portions, means to adjust each of said scrapers to and from its cooperating roll, a gripping and pulling means extending longitudinally of said chassis from a point adjacent said feeding table to a point adjacent said third roll, said gripping means being constructed and arranged to grip said stalks adjacent the butt ends thereof, a plurality of conveyors arranged in side by side relationship and running parallel to said gripping and pulling means from a point adjacent said feeding table to a point adjacent said first roll, means on said last mentioned conveyors engaging said stalks at intervals throughout the length thereof, a second gripping and pulling means spaced laterally from said first gripping and pulling means and extending longitudinally of said chassis from a point adjacent the end of said first gripping and pulling means to a point of discharge, a plurality of conveyors arranged in side by side relationship and running parallel to said second gripping and pulling means from a point adjacent said second roll to a point of discharge, power means on said chassis for rotating said rolls and for operating said gripping and pulling means and conveyors whereby the ramie stalks will be fed to said first roll by said first gripping and pulling means and said conveyor means extending parallel thereto to partially clean the upper portion of said stalks and whereby upon continued movement of said first gripping and pulling means said stalks will be engaged by said second roll to complete the cleaning of the upper portion thereof, said stalks being released by said first gripping and pulling means and being engaged at a different location by said second gripping and pulling means whereby upon movement of said second gripping and pulling means the butt end portions of said stalks will be engaged by said third roll to partially clean said portion, and whereby upon further movement of said second gripping and pulling means said butt end portions will be engaged by said fourth roll to complete the cleaning thereof and whereby upon further movement of said second gripping and pulling means and said conveyors adjacent thereto the completely cleaned stalks will be discharged therefrom.

6. A decorticator for ramie comprising in combination a chassis, running gear on said chassis, conveyer means constructed and arranged to convey ramie stalks to a feeding table on said chassis, a pair of rotatable scraping rolls mounted at right angles to each other in the path of movement of the upper portions of said stalks, stationary scrapers adjacent each roll and cooperating therewith to scrape bark and other unwanted material from said stalks, a second pair of scraping rolls rotatably mounted at right angles to each other, said second pair of rolls being spaced laterally and longitudinally from said first pair of rolls, a stationary scraper adjacent each roll of said second pair and cooperating therewith to scrape bark and other unwanted material from the butt end portions of said stalks means to adjust each of said scrapers to and from its cooperating roll, gripping and pulling means extending longitudinally of said chassis from a point adjacent said feeding table to a point adjacent said second pair of rolls, said gripping means being constructed and arranged to grip said stalks adjacent the butt ends thereof and to pull the upper portions of said stalks between the stationary scrapers and rolls of said first pair, conveyer means adjacent said gripping and pulling means and cooperating therewith to feed said stalks to said first pair of rolls, a second gripping and pulling means spaced laterally from said first gripping and pulling means and extending longitudinally of said chassis from a point adjacent the end of said first gripping and pulling means to a point of discharge, said second gripping and pulling means being constructed and arranged to engage said stalks upon release by said first gripping and pulling means at a point laterally removed from the point of first engagement and to pull the butt end portions of said stalks between the stationary scrapers and rolls of said second pair of rolls to clean the butt end portions thereof, stripping means adjacent the discharge end of said second gripping and pulling means for stripping said stalks therefrom, conveyor means adjacent said second gripping and pulling means and cooperating with said stripping means to discharge the cleaned stalks from the apparatus and power means on said chassis constructed and arranged to operate said gripping and pulling means and said cleaning means.

7. A decorticator for ramie comprising in combination a chassis, runing gear on said chassis, conveyer means constructed and arranged to convey ramie stalks to a feeding table on said chassis, means on said chassis for cleaning the upper portions of said stalks, a second means on said chassis for cleaning the butt end portions of said stalks, gripping means for engaging said stalks adjacent the butt ends thereof and for pulling the upper portions of said stalks through said first cleaning means, said gripping means comprising a pair of chains arranged vertically in the same plane and extending longitudinally of the chassis, the links of said chains being provided with resilient blocks whereby said ramie stalks will be gripped by the opposing blocks on said chains, backing plates engaging said chains, resilient means yieldably holding said plates against said chains whereby said resilient blocks are in engagement with said stalks, a second gripping means similar to said first gripping means for engaging said stalks at a point removed from the point of said first engagement and for pulling said butt end portions through said second cleaning means, ramie stripping means disposed adjacent the discharge end of said second gripping means and comprising a pivotally mounted generally U-shaped member having legs disposed on opposite sides of said second gripping means, a corrugated block carried by said stripping means, resilient means for urging said block into engagement with said chain whereby upon movement of the latter said stripping means will be vibrated to strip said ramie from said blocks and power means on said chassis constructed and arranged to operate said gripping means and said cleaning means.

8. A decorticator for ramie comprising in combination a chassis, conveyer means constructed and arranged to convey ramie stalks to a feeding table on said chassis, means on said chassis for cleaning the upper portions of said stalks, a second means on said chassis for cleaning the butt end portions of said stalks, gripping means for engaging said stalks adjacent the butt ends thereof and for pulling the upper portions of said stalks through said first cleaning means, said gripping means comprising a pair of chains arranged vertically in the same plane and extending longitudinally of the chassis, the links of said chains being provided with resilient blocks whereby said ramie stalks will be gripped between opposing blocks on said chains, backing plates engaging said chains, resilient means yieldably holding said plates against said chains whereby said resilient blocks are held in engagement with said stalks, a second gripping means similar to said first gripping means for engaging said stalks at a point removed from the point of said first engagement and for pulling said butt end portions through said second cleaning means, ramie stripping means disposed adjacent the discharge end of said second gripping means and including co-operating means on said chain and stripping means to vibrate the latter upon movement of said chain whereby the ramie will be stripped from said blocks and power means on said chassis constructed and arranged to operate said gripping means and said cleaning means.

WILLIAM E. WRIGHT.
ORSON H. BOND.

References Cited in the file of this patent

UNITED STATES PATENTS

| Number | Name | Date |
|---|---|---|
| 362,387 | Kauffman et al. | May 3, 1887 |
| 759,197 | Shely | May 3, 1904 |
| 824,243 | Hollier | June 26, 1906 |
| 1,255,065 | Teresa | Jan. 29, 1918 |
| 1,601,984 | Selvig | Oct. 5, 1926 |
| 1,718,587 | Selvig | June 25, 1929 |
| 2,078,419 | Selvig | Apr. 27, 1937 |
| 2,123,547 | Raney | July 12, 1938 |
| 2,142,587 | Lundgren et al. | Jan. 3, 1939 |
| 2,208,287 | Cochrane | July 16, 1940 |
| 2,443,296 | Brereton | June 15, 1948 |
| 2,490,157 | Reeves | Dec. 6, 1949 |
| 2,551,129 | Hulfish et al. | May 1, 1951 |